United States Patent [19]

Graiver et al.

[11] Patent Number: 5,422,050
[45] Date of Patent: Jun. 6, 1995

[54] REINFORCED POLYVINYL ALCOHOL HYDROGELS CONTAINING UNIFORMLY DISPERSED CRYSTALLINE FIBRILS AND METHOD FOR PREPARING SAME

[75] Inventors: Daniel Graiver, Midland; Arnold W. Lomas, Rhodes, both of Mich.

[73] Assignee: Mizu Systems Inc., Midland, Mich.

[21] Appl. No.: 157,498

[22] Filed: Nov. 26, 1993

Related U.S. Application Data

[62] Division of Ser. No. 990,390, Dec. 14, 1992, Pat. No. 5,336,651.

[51] Int. Cl.$^6$ ............... B29C 35/00; B29C 35/02; B29C 35/16
[52] U.S. Cl. ............... 264/28; 264/196; 264/345; 264/349; 264/185; 264/203; 524/503; 428/357; 428/359; 428/373; 428/374
[58] Field of Search ............... 264/28, 196, 345, 349; 524/503; 428/357, 359, 373, 374

[56] References Cited

U.S. PATENT DOCUMENTS

| | | | |
|---|---|---|---|
| 4,663,358 | 5/1987 | Hyon et al. | 521/64 |
| 4,851,168 | 6/1989 | Graiver et al. | 264/28 |

FOREIGN PATENT DOCUMENTS

| | | |
|---|---|---|
| 1236274 | 1/1985 | Japan. |
| 62-45637 | 6/1986 | Japan. |
| 1257026 | 1/1987 | Japan. |

OTHER PUBLICATIONS

"Kobunshi Kako" 39(6) 304–310 (1990) (CA114(16) :144304x).
"Kobunshi Ronbunshi" 46 (11) 673–80 (1989) (CA112 (12):99763s).
"J. Controlled Release" 18(2), 95–100; (CA116(16) : 158711f).
R. Ofstead et al. in Adv. Chem. Ser., 223 (Polym. Aqueous Media), 61–72 (CA112(6) :42493z).
"Kobunshi Ronbunshu" 47(12), 1001–4 (1990) (CA114(8) : 63302t).

*Primary Examiner*—Patrick J. Ryan
*Assistant Examiner*—Richard C. Weisberger
*Attorney, Agent, or Firm*—Robert L. McKellar

[57] ABSTRACT

This invention provides reinforced composite structures consisting essentially of a matrix and a dispersed phase, where the matrix is a hydrogel containing water and a solubilized vinyl alcohol homopolymer, the dispersed phase contains a plurality of uniformly distributed acicular regions consisting of fibrils formed from a highly oriented crystalline vinyl alcohol polymer, where the diameter of the said fibrils is less than 1 millimeter, the aspect ratio of the fibrils is from 2:1 to 1000:1, and where the composite is characterized by a gradual transition in the degree of crystallinity at the interfaces between the matrix and the fibrils.

3 Claims, No Drawings

REINFORCED POLYVINYL ALCOHOL HYDROGELS CONTAINING UNIFORMLY DISPERSED CRYSTALLINE FIBRILS AND METHOD FOR PREPARING SAME

This is a divisional of copending application Ser. No. 07/990,390 filed on Dec. 14, 1992; now U.S. Pat. No. 5,336,651.

BACKGROUND OF THE INVENTION

1. Field of the Invention

This invention relates to polyvinyl alcohol hydrogels. More particularly, this invention relates to polyvinyl alcohol hydrogels containing uniformly dispersed and highly oriented crystalline regions that substantially improve the physical properties of the hydrogel.

2. Background of the Invention

The chemical and physical properties of polyvinyl alcohol hydrogels make them useful materials for a variety of end use applications, including filtration and ion exchange membranes, bio-compatible films, fibers and other shaped articles, contact lenses, devices for the controlled delivery of materials, coatings and filler materials.

The formation and physical properties of polyvinyl alcohol hydrogels are discussed in a review article by Hyon in the journal "Kobunshi Kako" 39(6) 304–10 (1990) [CA114(16):144304x].

Gels, fibers and other products prepared from solutions of polyvinyl alcohol in water or a mixture of water and a water-miscible organic solvent such as methanol, propanol, dimethyl sulfoxide and N,N-dimethylformamide are well known from numerous patents and other publications. Typical of recently issued patents describing gels formed from aqueous solutions of polyvinyl alcohol is U.S. Pat. No. 4,663,358, which issued to Hyon et al on May 5, 1987 and U.S. Pat. No. 4,851,168, which issued to D. Graiver et al. on Jul. 25, 1989. These patents teach cooling to below room temperature a solution of polyvinyl alcohol in a mixture of water and a water-miscible organic solvent such as alcohols containing from 1 to 4 carbon atoms, glycols and dimethyl sulfoxide. Mixtures of water and dimethyl sulfoxide are preferred, and the water can constitute from 10 to 90 weight percent of the solvent mixture. The gel formed by cooling the solution Is then immersed in flowing water to remove the organic solvent.

Hydrogels prepared as described in the Hyon and Graiver et al. patents are transparent whereas gels formed using a solution of polyvinyl alcohol in either water or dimethyl sulfoxide as the only solvent are opaque.

For some end uses such as biomedical applications it is desirable to maximize the tensile strength and other physical properties of polyvinyl alcohol hydrogels. This is particularly true for hydrogels containing more than about 40 weight percent of water.

Techniques that have been used to improve the physical properties of polyvinyl alcohol hydrogels typically involve crosslinking by radiation or chemical means, increasing the crystallinity of the polymer and/or adding reinforcing agents. The improvements in tensile properties achieved by crosslinking are typically less than desirable, and are accompanied by reduced swelling in water, which is desirable for some applications, and insolubility of the polymer in water and organic solvents such as hot water and dimethyl sulfoxide that dissolve non-crosslinked polymers.

The aforementioned U.S. Pat. No. 4,851,168, issued to D. Graiver et al. and Japanese patent publication no. 1/257,026, published on Oct. 13, 1989 teaches preparing high strength fibers and films from polyvinyl alcohol (PVA) hydrogels by spinning or extruding solutions of PVA with degrees of polymerization greater than 1500 and drawing the resultant products using draw ratios greater than 10. The Japanese patent publication teaches shrinking the resultant fiber or film in a water bath at a temperature at least 5 degrees below but not more than 50 degrees below the temperature at which the PVA will dissolve in the bath.

Hyon et al. in the journal "Kobunshi Ronbunshu" 46 (11) 673–80 (1989) [CA112(12):99763s] teach freezing a concentrated aqueous solution of PVA followed by slow crystallization of the frozen polymer above its freezing point to produce a semi-crystalline polymer with a microporous structure.

The use of repeated freeze-thaw cycles to increase the strength and rigidity of PVA hydrogels intended to control the release of pharmaceuticals and serum albumin is taught by N. Peppas et al. [J. Controlled release, 18(2), 95–100; CA116(16): 158711f]

The preparation of microspheres of non-crosslinked PVA exhibiting good compressive strength by dispersing an aqueous solution of the polymer in a water-immiscible liquid, freezing the solution and crystallizing the PVA at a temperature of 0 to 10° C. is reported in Japanese patent publication 62/45637, published on Feb. 22, 1987.

The preparation of semicrystalline hydrogels from copolymers derived from vinyl trifluoroacetate and comonomers such as maleic acid is described by R. Ofstead et al. in Adv. Chem. Ser., 223 (Polym. Aqueous Media) , 61–72 [CA112(6):42493z]

The preparation of reinforced composites by blending polyvinyl alcohol, water and alumina, compressing the resultant mixture and aging it with heating is described by Sakai et al. in Japanese patent publication no. 1/236,274. An exemplified composite exhibited a flexural strength of 40 MPa.

PVA/silica composite hydrogels are reported by S. Ikoma et al. in "Kobunshi Ronbunshu" 47(12), 1001–4 (1990) [CA114(8) : 63302t). The improved mechanical and theological properties achieved by the addition of silica are attributed to microscopic bond formation between the silica and the PVA.

It is known in the art relating to reinforcement that for a reinforcing agent to function effectively it must be bonded to the matrix material. In the past this type of bonding has typically been achieved using coupling agents such as silanes containing organofunctional groups.

One objective of this invention is to improve the physical properties such as tensile strength, modulus and toughness of non-crosslinked polyvinyl alcohol hydrogels by providing uniformly dispersed highly crystalline regions that are bonded to the adjoining polymer matrix.

A second objective of this invention is to provide a method for introducing highly crystalline regions into a polyvinyl alcohol hydrogel. The regions function as reinforcing agents for the hydrogel.

SUMMARY OF THE INVENTION

The objectives of this invention are achieved by novel reinforced composite structures consisting essentially of a matrix and a dispersed phase, where the matrix is a hydrogel containing water and a solubilized vinyl alcohol homopolymer, the dispersed phase contains a plurality of uniformly distributed acicular regions consisting of fibrils formed from a highly oriented crystalline vinyl alcohol polymer, where the diameter of the said fibrils is less then 1 millimeter, the aspect ratio of the fibrils is from 2:1 to 1000:1, and where the composite is characterized by a gradual transition in the degree of crystallinity at the interfaces between the matrix and the fibrils.

DETAILED DESCRIPTION OF THE INVENTION

This invention provides reinforced composite structures consisting essentially of a matrix and a dispersed phase, where the matrix is a hydrogel comprising water and a solubilized vinyl alcohol homopolymer, the dispersed phase comprises a plurality of uniformly distributed acicular regions consisting essentially of fibrils of an oriented crystalline vinyl alcohol polymer wherein at least 50 percent of the repeating units are $CH_2CH(OH)$, the diameter of said fibrils is less than 1 millimeter, the aspect ratio of said fibrils is from 2:1 to 1000:1, and where said composite is characterized by a continuous transition in degree of crystallinity at the interfaces between said matrix and said fibrils.

This invention also provides a method for preparing the present reinforced hydrogels, said method comprising the sequential steps of forming a solution of a vinyl alcohol polymer in a liquid consisting essentially of from 10 to 90 weight percent dimethyl sulfoxide, any remaining portion of said liquid being selected from the group consisting of water, alcohols containing from 1 to 4 carbon atoms and mixtures of water and said alcohols;

blending the resultant solution with fibrils consisting essentially of a crystalline, oriented polyvinyl alcohol where said fibrils exhibit a diameter of less than 1 millimeter and an aspect ratio of from 2:1 to 1000:1;

heating the resultant dispersion under conditions that disrupt the crystallinity in the surface layer of the fibrils without disrupting the crystalline structure in the remaining portion of the fibrils, and cooling said dispersion under conditions that initiate formation of a gel.

The characterizing feature of the present composites is a continuous transition in degree of crystallinity at the interfaces between the substantially non-crystalline polyvinyl alcohol hydrogel matrix and the oriented crystalline acicular fibrils of vinyl alcohol polymer that function as the reinforcing agent for the composite. For the purposes of this invention, the "continuous transition in the degree of crystallinity" between the matrix and the fibrils should be understood to mean that as observed by optical microscope the discontinuous character of the initial boundary between the fibrils and polymer matrix has been substantially eliminated.

In a preferred embodiment the reinforcing agent is uniformly dispersed segments of small diameter, highly crystalline fibers formed from a vinyl alcohol polymer. The fiber segments are typically from 50 microns to about 20 mm. in length and from 5 microns to about 0.5 mm. in diameter. The aspect ratio of the segments is typically from 2:1 to 1000:1. No appreciable reinforcement is observed below these ranges.

Bonding between the fiber segments, also referred to as fibrils, and the matrix of vinyl alcohol polymer hydrogel is achieved by disrupting the crystalline surface layer of the fibrils while they are dispersed in a solution of a vinyl alcohol polymer containing water and dimethyl sulfoxide as the major components of the solvent. The resultant dispersion is subsequently cooled under conditions that will initiate formation of the hydrogel that forms the matrix of the present composites.

The dispersion of the fibrils in the solubilized vinyl alcohol homopolymer is heated at a temperature of from 50 to about 110 0 C., preferably from 75° to 850 C., for a period of time sufficient to disrupt the crystalline structure at the surface of the fibrils without substantially disrupting their interior crystalline structure and orientation.

Disruption of the surface of the fibrils can be observed under an optical microscope as the gradual disappearance of the initial clearly defined boundary at the interface between the fiber and the solution of vinyl alcohol polymer as the heating period progresses. A preferred method for achieving disruption of the fibrils' surface is described in a subsequent portion of this specification.

The amorphous region resulting from disruption of the crystalline structure at the surface of the fibrils is identical in structure to the solubilized vinyl alcohol homopolymer. This amorphous region serves as the adhesive that bonds the fibrils to the PVA matrix when the dispersion is cooled to below about 10° C. but above the freezing point of the polymer solution.

The Hydrogel- and Fiber-Forming Vinyl Alcohol Polymers

As used in this specification the term "vinyl alcohol homopolymer" refers to the polymer that forms the matrix of the present composites.

The vinyl alcohol polymer from which the fibrils of the present composites are formed contain at least 50 mole percent of repeating units corresponding to the formula $—CH_2CH(OH)—$.

The polymers used to prepare the matrix and the fibrils of the present composite materials are in turn typically prepared by hydrolysis or saponification of polymers containing repeating units derived from vinyl acetate or other vinyl ester of a carboxylic acid.

The degree of hydrolysis of vinyl alcohol polymers varies depending upon their intended end use. The vinyl alcohol polymers used to prepare both the hydrogel matrix and reinforcing fibrils of the present composites are preferably at least 98 percent hydrolyzed and are linear or contain at most a minimal degree of branching. The reason for this preference is to achieve the maximum degree of intermolecular interaction such as hydrogen bonding.

The vinyl alcohol homopolymers that form the present hydrogels are typically not crosslinked. Crosslinking can detract from physical and chemical properties of the hydrogel.

Depending upon the physical and chemical properties desired in the final composite, the vinyl alcohol polymers used to prepare the fibrils that serve as the reinforcing agents of the present composites can be crosslinked. Methods for crosslinking include the use of radiation or other means of generating free radicals and reaction of the hydroxyl groups of the polymer with aldehydes, borates or polyfunctional organic compounds such as carboxylic acids.

The molecular weight of the polyvinyl alcohol used to prepare the present hydrogels and fibrils is also determined by the end use of the polymer. Regardless of the intended end use, the polyvinyl alcohol should have a weight average molecular weight of greater than 44,000, preferably at least 75,000. Commercially available polymers with molecular weights of from 75,000 to 440,000 are preferred, particularly those polymers containing relatively large concentrations of syndiotactic or isotactic segments within the polymer molecules.

Preparation of the Solubilized Vinyl Alcohol Polymer

The polymer solution into which the fibrils are dispersed is prepared by heating a vinyl alcohol homopolymer in the presence of a solvent mixture containing a mixture of dimethyl sulfoxide with water and/or an alcohol as the major, preferably the sole, components. The dimethyl sulfoxide constitutes form 10 to 90 weight percent, preferably from 60 to 90 weight percent, of the solvent.

The preferred polymer concentration range will depend upon the molecular weight of the polymer. Typically the properties of PVA hydrogels, particularly tensile strength and elongation at break, increase with increasing concentration and/or molecular weight of the polymer. Polymer concentrations of from about 5 to about 20 weight percent, based on the combined weight of polymer and solvent, are preferred.

Solubilization of the polymer can be facilitated by heating the polymer/solvent mixture to temperatures from 50° C. up to the boiling point of the mixed solvent and stirring until the polymer is completely dissolved. Heating is preferably done under an atmosphere of nitrogen or other inert gas to minimize degradation of the vinyl alcohol polymer.

The Polyvinyl Alcohol Fibers and Fibrils

Fibers can be prepared from solutions of vinyl alcohol polymers using conventional spinning and drawing methods taught in the prior art, including U.S. Pat. Nos. 4,765,967 to Hyon et al. and 4,851,168 to D. Graiver et al., the relevant portions of which are incorporated by reference. A detailed discussion of the preparation and properties of polyvinyl alcohol fibers is contained in a text by I. Sakurada entitled "Polyvinyl Alcohol Fibers" (Marcel Dekker, New York, 1985).

Polymer solutions that are converted into fibers typically contain from 2 to about 30 percent by weight of a polyvinyl alcohol or a vinyl alcohol copolymer exhibiting a molecular weight of at least 66,000. As discussed in the preceding section of this specification, the highest possible molecular weight polymers are desirable when the objective is to maximize tensile properties of the final fiber.

The lowest concentration value for a given molecular weight polymer is preferred, based on the ability of these compositions to form fibers exhibiting diameters of 50 microns or less with a minimum amount of drawing. These small diameter fibers are desirable based on their uniformity and excellent tensile properties. Most preferably the concentration of polymer in the spinning solution is from 2 to about 10 weight percent.

The temperature of the liquid or gas into which the spinning solution is extruded and coagulated can range from just above the freezing point of a liquid coagulating bath to ambient or higher for a gaseous coagulating medium.

The oriented crystalline structure that characterize the fibrils used to prepare the present composites is developed by drawing the extruded fibers. The extent to which fibers are drawn is often referred to as the draw ratio, which can be up to 10 or higher, depending upon the degree of orientation desired.

Fibers suitable for use in preparing the reinforced hydrogels of the present invention are less than one millimeter in diameter, preferably from 5 microns to about 0.5 mm.

Prior to being dispersed in the solubilized vinyl alcohol polymer used to prepare the present compositions the fibers are cut into segments, also referred to in this specification as fibrils, measuring from 50 microns to 2 cm. in length. The ratio of the length of these fibrils to their diameter, referred to as their aspect ratio, is typically from 2:1 to 1000:1.

Formation of the Fibril Reinforced Hydrogel

Precursors of the present reinforced hydrogels are prepared by dispersing from 0.1 to about 20 weight percent of fibrils, based on the weight of the solubilized polyvinyl alcohol, into the polymer solution. To avoid dissolving the fibrils at this stage of the process the dispersion is preferably prepared under ambient conditions where the temperature of the polymer solution is from 20° to 30° C.

The critical Step of the present method involves heating the dispersion of fibrils for a period of time and at a temperature sufficient to disrupt the crystalline structure at the surface of the fibrils without modifying their oriented crystalline interior portion. During this step the dispersion is stirred while being heated to a temperature of from 50° to 110° C., preferably from 75° to about 85° C. Samples of the dispersion are withdrawn periodically and examined under an optical microscope for evidence of a change in crystallinity of the fibril surface.

At the beginning of the heating period a clearly defined boundary is observed at the interface between the highly oriented crystalline fibrils and the polymer solution. As heating of the dispersion is continued this boundary is transformed from a clearly defined one to a continuous transition between the crystalline regions of the fibrils and the relatively amorphous polymer solution. It is at this point that heating and stirring of the dispersion are discontinued.

The heating period required to disrupt the crystallinity at only the surface of the fibrils is determined by a number of variables, including the molecular weight and crystallinity of the vinyl alcohol polymer in the fibrils and the efficiency of heat transfer between the polymer solution and the surface of the fibrils. Heating periods of from 10 to 30 minutes at a temperature of 80° C. are typical. The dispersion is preferably stirred to optimize the transfer of heat throughout the dispersion, prevent localized overheating and ensure a uniform distribution of fibrils throughout the dispersion.

Continued heating beyond the point of initial liquefaction of the polymer at the surface of the fibrils is not only unnecessary, it may be also undesirable as it will gradually destroy their highly oriented crystalline structure.

In accordance with the present method, the dispersion of fibrils in a solubilized polyvinyl alcohol is poured into a container of the desired shape and cooled to a temperature below $-10$ degrees, preferably below $-20$ degrees C., for a period of time sufficient to convert the solubilized vinyl alcohol polymer to a non-flowing gel.

The time period required to form a gel depends upon a number of variables, including the concentration and molecular weight of the polymer and the raze at which the solution is cooled. Taking all of these variables into account, the time period during which the solution is cooled is generally from 2 to 16 hours.

The present inventors found that for the types and concentrations of polymers and the range of processing conditions they evaluated no significant additional improvement in properties of the final hydrogel was apparent after 16 hours of cooling.

To optimize the properties of the final fibril-reinforced hydrogel it is desirable to replace the dimethyl sulfoxide portion of the polymer solvent with water following conversion of the polymer solution to a gel. A preferred method for achieving this replacement is to allow the gel to warm to ambient temperature and then place it in a water-miscible alcohol such as methanol, ethanol or propanol that is miscible with dimethyl sulfoxide but is a non-solvent for the gel. The alcohol a more effective extractant for dimethyl sulfoxide than water, thereby considerably shortening the time required to replace all of the dimethylsulfoxide in the gel relative to prior art methods.

The time required to extract the dimethyl sulfoxide from the gel can vary from several minutes to several days. This time interval is dependent upon the surface to volume ratio of the particular sample. When this exchange has been completed the gel is removed from the alcohol bath and placed in a water bath to replace the alcohol. The use of a circulating water maintained at a temperature of from just above freezing to about 60 degrees C. is preferred.

The water content of the final hydrogel can range from 20 to about 98 weight percent. The preferred range is determined by the end use application of the hydrogel.

Numerous end use applications for high strength, reinforced PVA hydrogels are disclosed in the prior art. These applications include but are not limited to fabrication into shaped articles such as films, tubing, fibers and contact lenses. The composites are also useful for incorporation into and biocompatible medical products such as catheters and prostheses to replace damaged or missing limbs or appendages such as fingers and toes.

Hydrogels formed from vinyl alcohol polymers can also be used as vehicles for the controlled release of various materials, including drugs and other medicaments, air fresheners, perfumes, and biologically active materials such as pesticides, fertilizers and herbicides.

EXAMPLE

The following example describes a preferred reinforced composite hydrogel of this invention and a method for preparing the hydrogel, and should not be interpreted as limiting the scope of the invention as defined in the accompanying claims. Unless specified all parts and percentages in the example are by weight and viscosities were measured at 25° C.

A glass reactor equipped with a water cooled reflux condenser, mechanically operated stirrer and nitrogen inlet was charged with 30.26 parts of distilled water, 121.04 parts of dimethyl sulfoxide and 17 parts of finely divided polyvinyl alcohol exhibiting a weight average molecular weight of 86,000. The stirrer was operated to achieve a homogeneous dispersion of the solid polymer, at which time the dispersion was heated to 100° C. for a period of time sufficient to completely dissolve the polymer.

The resultant solution of polyvinyl alcohol was then allowed to cool to 80° C., at which time 1.7 parts of polyvinyl alcohol fiber segments measuring 1 mm. in length and 16 microns in diameter were dispersed into the solution. The fibers were cut from a tow supplied by Unitika K.K. The fibers were wet spun and the degree of polymerization of the polymer was 1700.

Samples were removed from the heated dispersion at intervals of about 10 minutes and a drop placed on a microscope slide. The slide was then examined under an optical microscope. Heating and stirring were discontinued as soon as the initial sharply defined boundary at the interface between the crystalline fiber segments (fibrils) and the solubilized polyvinyl alcohol became indistinct. The dispersion was then poured as a 0.13 cm-deep layer into a Petri dish and the dish was placed in a freezer maintained at a temperature of $-20°$ C. for 16 hours followed by 4 hours at 4° C. The gel was removed from the mold and placed in a bath of methanol to extract the dimethyl sulfoxide. The methanol was then replaced with water by immersing the gel for 12 hours in a circulating water bath maintained at ambient temperature.

The tensile strength and elongation of the reinforced hydrogel were determined using a standard tensile bar that had been cut from the gel. Tear strength was determined as described in ASTM test procedure D 624 (Die B Tear Strength) using a tensile bar with a ¼ inch (0.6 cm)-long notch. These property values were dependent upon the length of the heating period of the dispersion of fibrils in the PVA solution. These values are recorded in the following table as "tensile", "elongation" and "tear" together with the values for a control that did not contain any fibrils.

TABLE 1

| Heating Time (Min) | Tensile (psi/Mpa) | Elongation (%) | Tear Strength (pli//kN/m) |
|---|---|---|---|
| 20 | 242/1.7 | 255 | 21//3.8 |
| 40 | 367/2.5 | 336 | 19//3.4 |
| 180 | 337/2.3 | 285 | 23//4.0 |
| 0* | 146/1.0 | 213 | 15//2.7 |

* = Control Example

That which is claimed is:

1. A method for preparing a reinforced polyvinyl alcohol composite, said method comprising the steps of
   1) forming a solution of a vinyl alcohol homopolymer in a liquid consisting essentially of from 10 to 90 weight percent dimethyl sulfoxide, any remaining portion of said liquid being selected from the group consisting of water, alcohols containing from 1 to 4 carbon atoms and mixtures of water and said alcohols;
   2) forming a dispersion by blending the resultant solution with from 0.1 to 20 weight percent, based on the weight of said homopolymer, of fibrils consisting essentially of a crystalline, oriented polyvinyl alcohol, where said fibrils exhibit a diameter of less than 1 millimeter and an aspect ratio of from 2:1 to 1000:1;
3) heating the resultant dispersion to a temperature of from 50 to 110 degrees celsius and stirring the dispersion so to disrupt the crystallinity of the surface layer of said fibrils without disrupting the crystalline structure in the remaining portion of said fibrils,
4) cooling the dispersion sufficiently to initiate formation of a gel, and
5) replacing substantially all of the non-aqueous liquids in said gel with water to obtain a composite hydrogel containing from 20 to 98 weight percent water.

2. A method according to claim 1 where the weight ratio of the fibrils to said homopolymer is from 0.1 to 20, the length of said fibrils is from 50 microns to 20 mm, the dimethyl sulfoxide constitutes from 60 to 90 weight percent of said liquid, the concentration of solubilized vinyl alcohol polymer is from 5 to 20 weight percent, based on the combined weight of solubilized polymer and liquid, the dispersion is heated to between 50° and 110° C. and is then cooled to below −10° C.

3. A method according to claim 2 where the vinyl alcohol polymer present in the fibrils is a homopolymer, said dispersion is heated to between 75° and 85° C. and cooled to below −20° C.

* * * * *